(12) United States Patent
Lin et al.

(10) Patent No.: US 11,287,908 B2
(45) Date of Patent: Mar. 29, 2022

(54) PRESSING DEVICE

(71) Applicant: SUNREX TECHNOLOGY CORP., Taichung (TW)

(72) Inventors: Shih-Pin Lin, Taichung (TW); Chun-Chieh Chen, Taichung (TW); Ling-Cheng Tseng, Taichung (TW); Yu-Shuo Yang, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 17/145,452

(22) Filed: Jan. 11, 2021

(65) Prior Publication Data
US 2022/0066580 A1    Mar. 3, 2022

(30) Foreign Application Priority Data
Aug. 26, 2020  (TW) .................................. 109211134

(51) Int. Cl.
*G06F 3/0354*    (2013.01)
*G06F 3/02*    (2006.01)

(52) U.S. Cl.
CPC ........ *G06F 3/03547* (2013.01); *G06F 3/0227* (2013.01)

(58) Field of Classification Search
None
See application file for complete search history.

(56) References Cited

FOREIGN PATENT DOCUMENTS

TW    I659344    5/2019

*Primary Examiner* — Aneeta Yodichkas
(74) *Attorney, Agent, or Firm* — Burris Law, PLLC

(57) ABSTRACT

A pressing device for a touchpad includes a base unit, an upper board unit, and an intermediate unit. The upper board unit includes a trigger switch aligned with the abutment portion of the base unit. The intermediate unit has a surrounding frame member, two positioning members, two connecting members, and a actuating member that are interconnected by a plurality of linking ribs. When the upper board is pressed at a position above one of the surrounding frame member and the connecting members, one of the connecting members is moved relative to the actuating member by virtue of the linking ribs, and the actuating member provides a force to convert the trigger switch from an initial state to a triggered state.

8 Claims, 10 Drawing Sheets

PRESSING DEVICE

CROSS-REFERENCE TO RELATED APPLICATION

This application claims priority to Taiwanese Utility Model Patent Application No. 109211134, filed on Aug. 26, 2020.

FIELD

The disclosure relates to an electronic device, and more particularly to a pressing device for a touchpad in an electronic device.

BACKGROUND

Most of the existing laptops today are equipped with a keyboard and a touch pad or a track pad as the input interface. Particularly, a touch pad includes a touch-sensitive area for a user to move a cursor on the screen, and also depressible keys to function as a left-click, a right-click and a scroll of a mouse.

As shown in FIG. 10, a conventional touch pad disclosed in Taiwanese Patent No. 1659344 includes a base board unit 100, a circuit board 200 and a touch board 300. The base board unit 100 includes a first side portion 110, a plurality of first hook seats 130 formed on the first side portion 110, a plurality of second hook seats 140 formed on the first side portion 110 and disposed at an inner side of the first hook seats 130, a second side portion 160 opposite to the first side portion 110, and a triggering unit 150 disposed on the second side portion 160. The conventional touch pad further includes a holder 220 fixed on the base board unit 100 at the first side portion 110, and an elastic switch 270 disposed on the circuit board 200 to correspond in position to the triggering unit 150. The holder 220 includes a plurality of elastic hooks 240 engaging respectively with the first hook seats 130, and a plurality of limit hooks 260 engaging with the second hook seats 140.

When the side of the circuit board 200 with the elastic switch 270 (the side that corresponds to the second side portion 160) is pressed, the circuit board 200 pivots relative to the base board unit 100 with the limit hooks 260 serving as a pivot axis, so that the elastic switch 270 is compressed by the triggering unit 150 to generate a corresponding signal.

However, when the side of the circuit board 200 which is adjacent to the holder 220 is pressed, the circuit board 200 is unable to pivot relative to the baseboard 100.

SUMMARY

Therefore, the object of the disclosure is to provide a pressing device for a touchpad that can alleviate at least one of the drawbacks of the prior art.

According to the disclosure, the pressing device includes a base unit, an upper board unit, and an intermediate unit. The base unit has an upper end surface, two support portions that are connected to the upper end surface, and a abutment portion that is connected to the upper end surface and that is disposed between the two support portions.

The upper board unit is disposed over the base unit, and includes a panel, a circuit board that is connected to and disposed under the panel, and a trigger switch that is connected to and disposed under the circuit board. The trigger switch is aligned with the abutment portion of the base unit.

The intermediate unit is disposed between the base unit and the upper board unit, and includes two positioning members that are mounted fixedly and respectively on the support portions of the base unit, a surrounding frame member that is mounted fixedly to a bottom of the circuit board, two connecting members that are opposite to each other, a actuating member that is connected to the abutment portion of the base unit and that is aligned with the trigger switch, and a plurality of linking ribs that interconnect the positioning members and the connecting members, the connecting members and the actuating member, and also the connecting members and the surrounding frame member.

When the upper board unit is pressed at a position above one of the surrounding frame member and the connecting members, one of the connecting members is moved relative to the actuating member by virtue of said linking ribs, which urges the actuating member against the abutment portion so the actuating member is driven to provide a force against the trigger switch to thereby convert the trigger switch from an initial state to a triggered state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
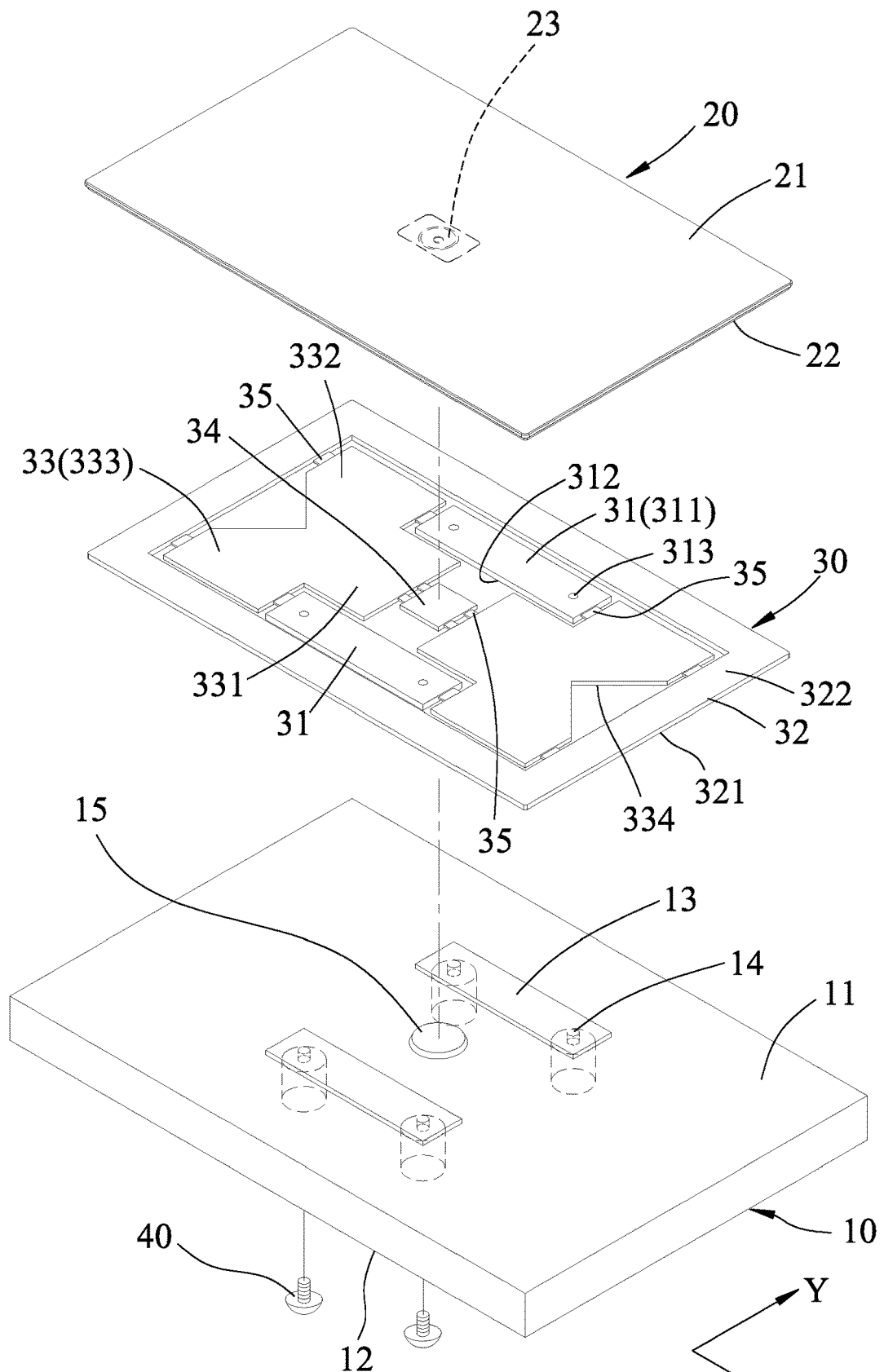
FIG. 1 is an exploded fragmentary perspective view illustrating an embodiment of the pressing device according to the disclosure.
Figure 2:
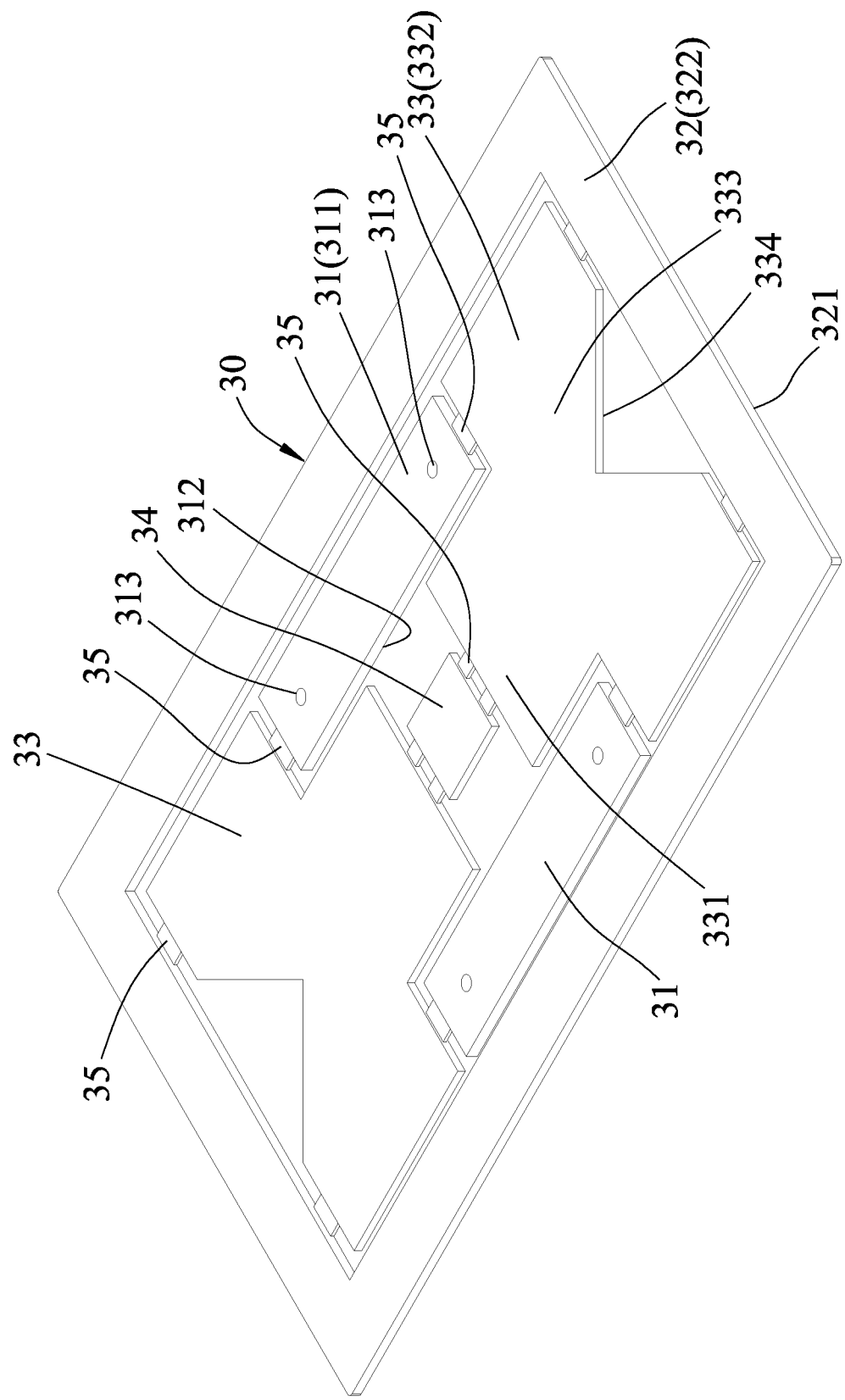
FIG. 2 is a perspective view of an intermediate unit of the embodiment.
Figure 3:
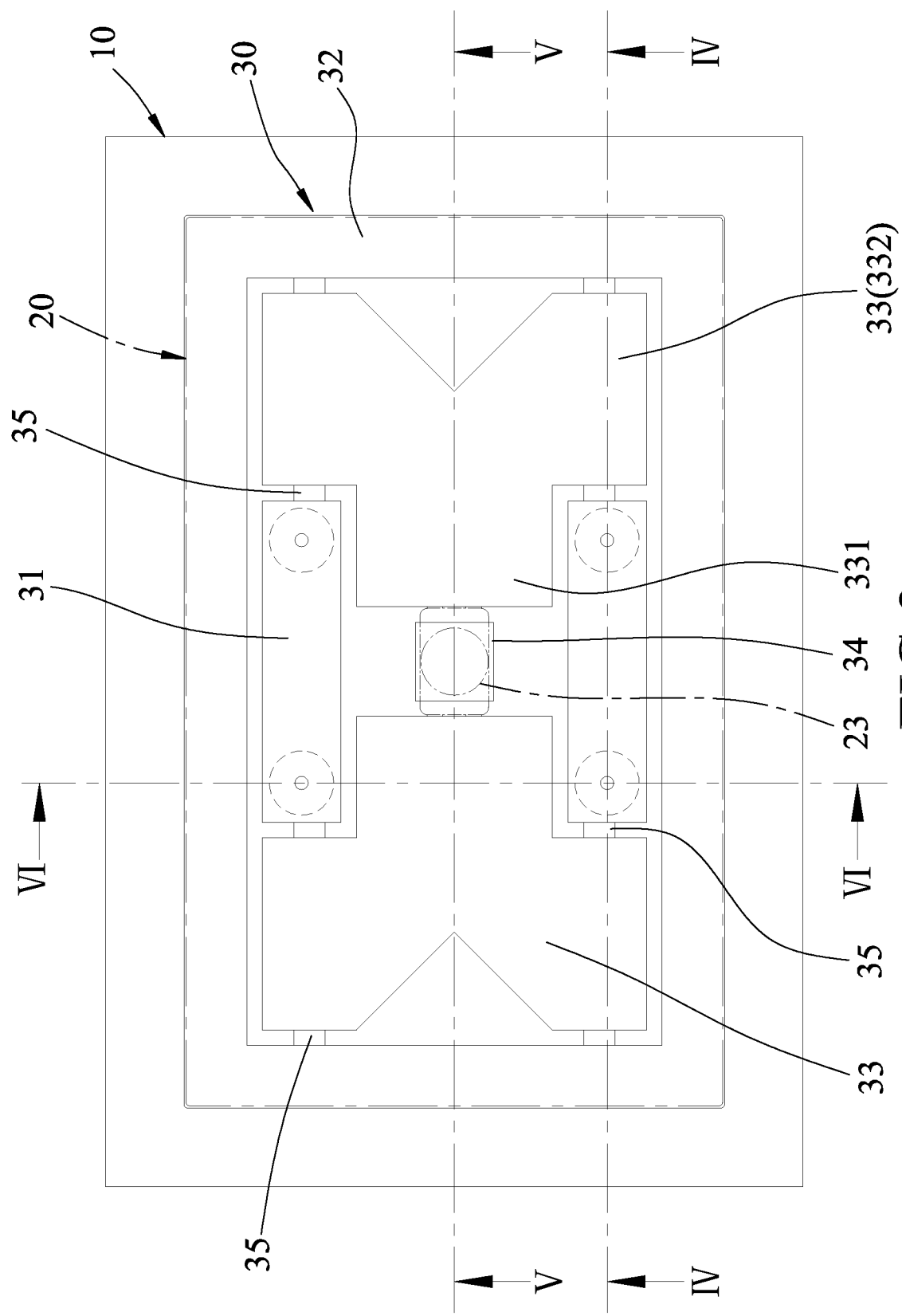
FIG. 3 is a fragmentary top view of the embodiment.
Figure 4:
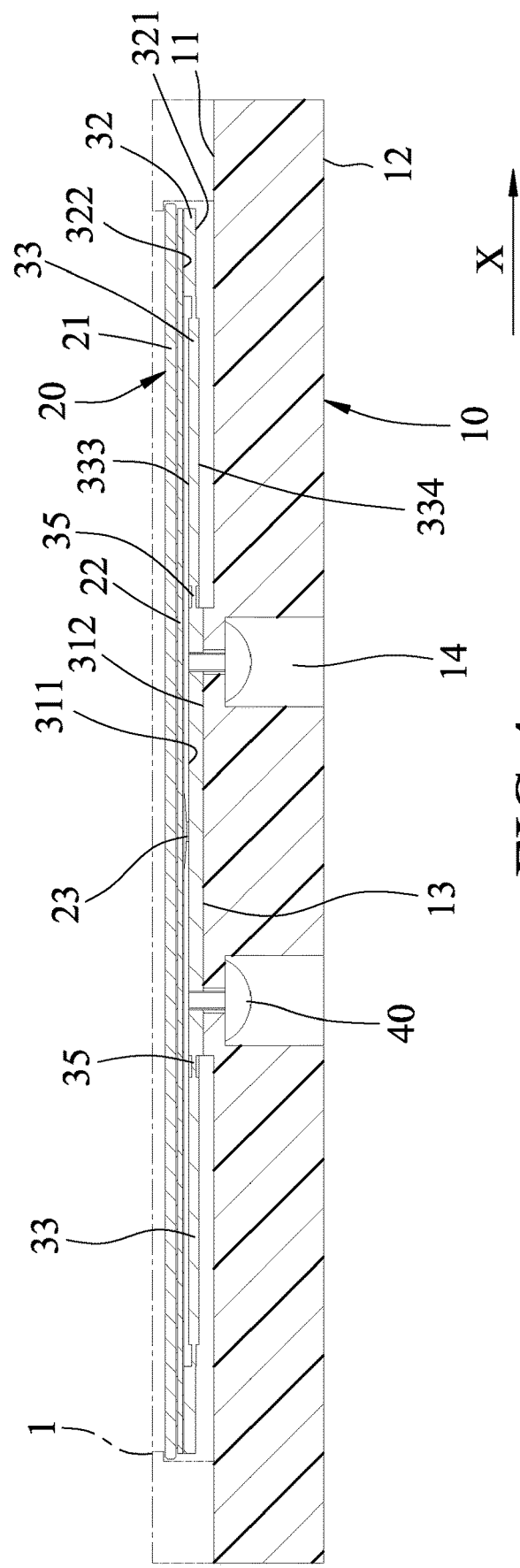
FIG. 4 is a sectional view taken along line IV-IV in FIG. 3.
Figure 5:
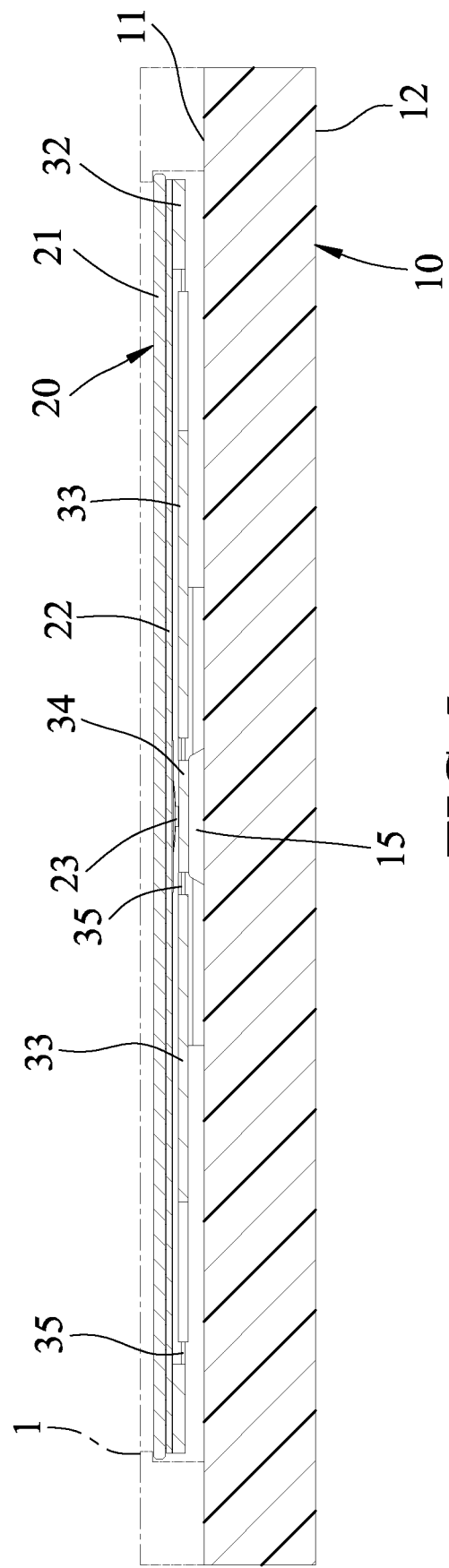
FIG. 5 is a sectional view taken along line V-V in FIG. 3.
Figure 6:
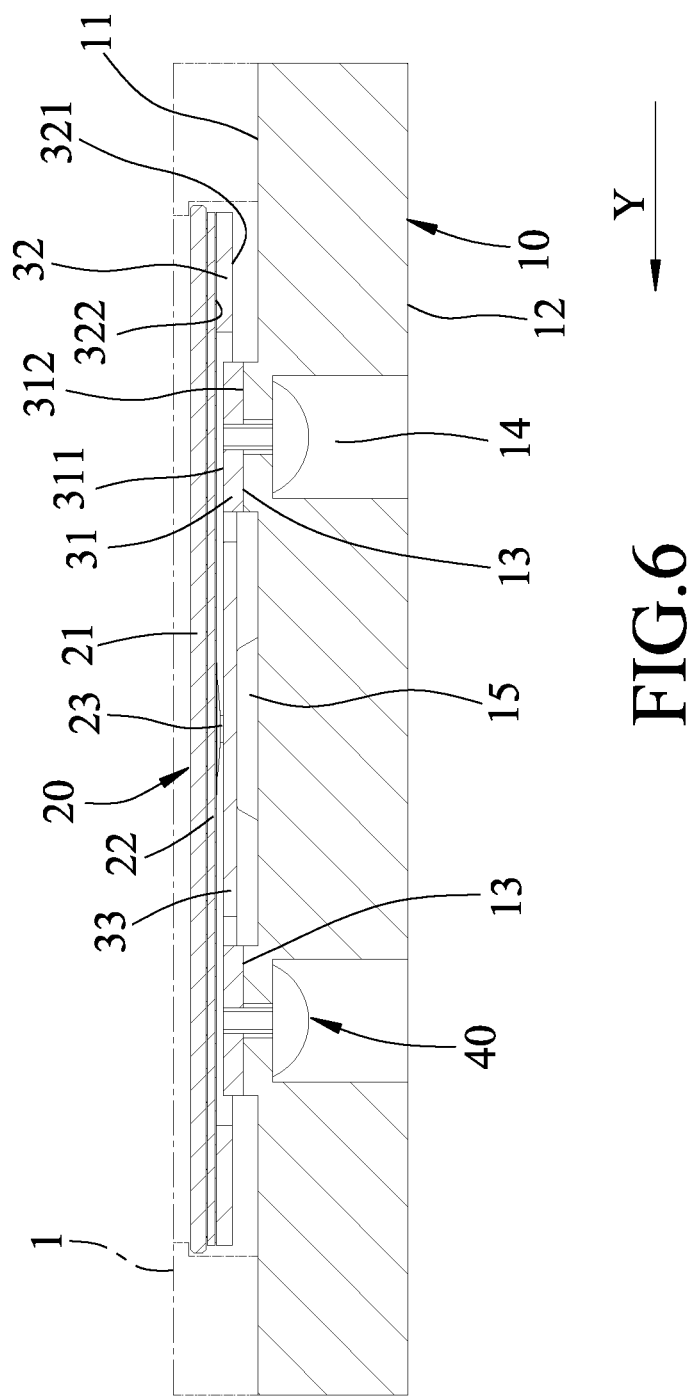
FIG. 6 is a sectional view take along line VI-VI in FIG. 3, illustrating a trigger switch in an initial state.
Figure 7:
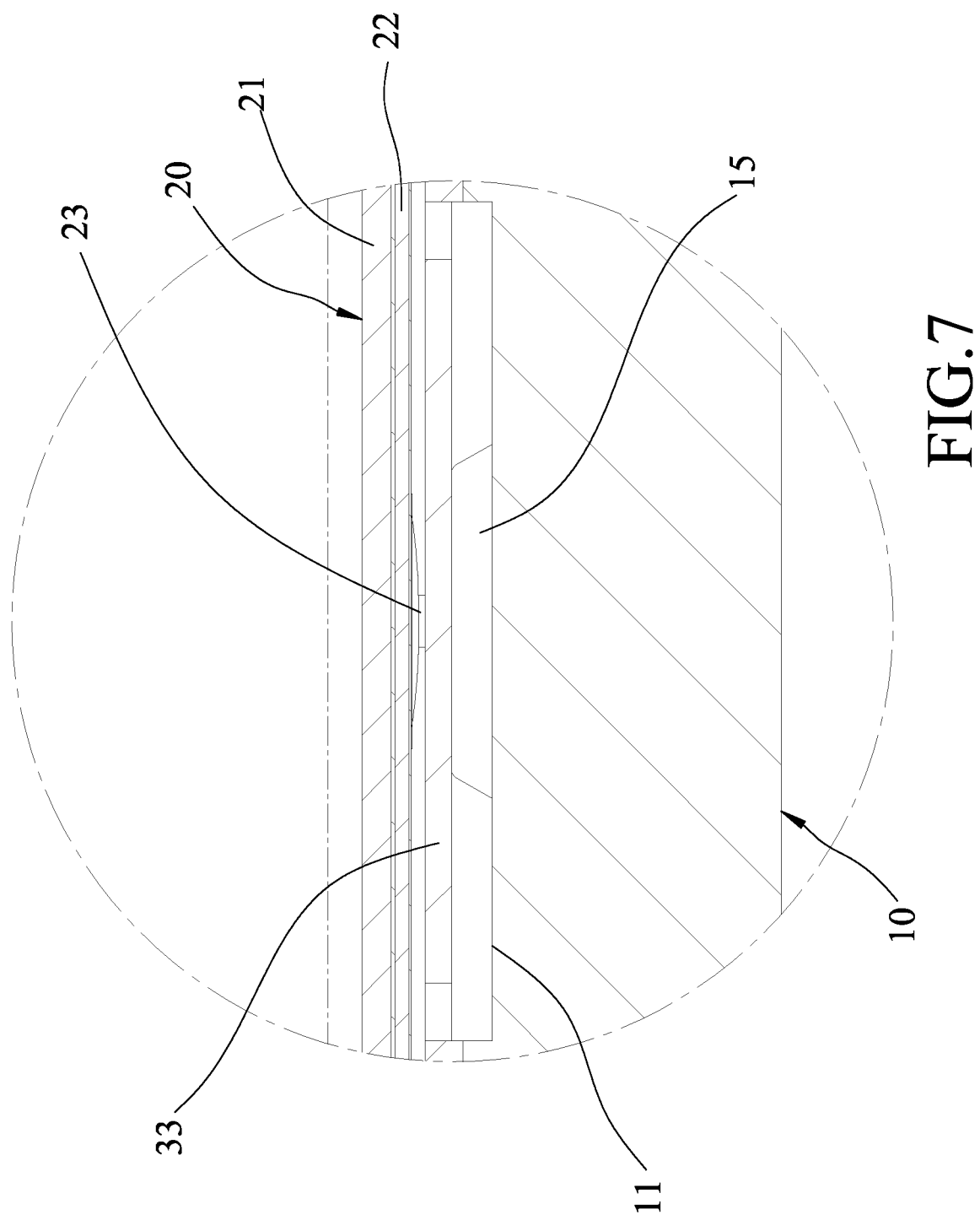
FIG. 7 is an enlarged, fragmentary view of FIG. 6.
Figure 8:
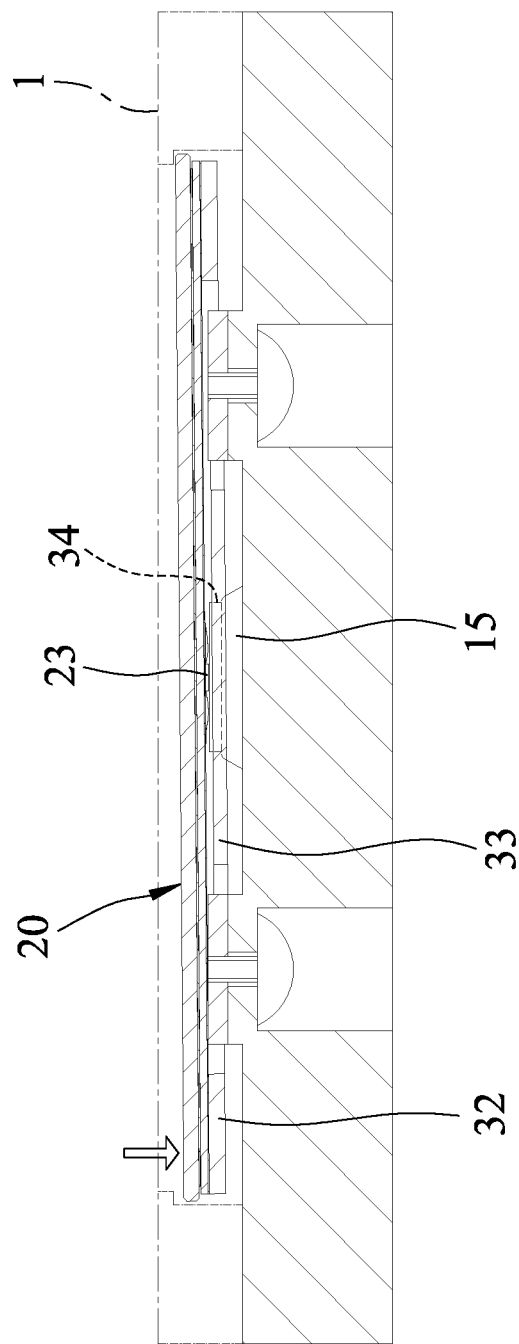
FIG. 8 is a fragmentary sectional view illustrating the trigger switch in a triggered state.
Figure 9:
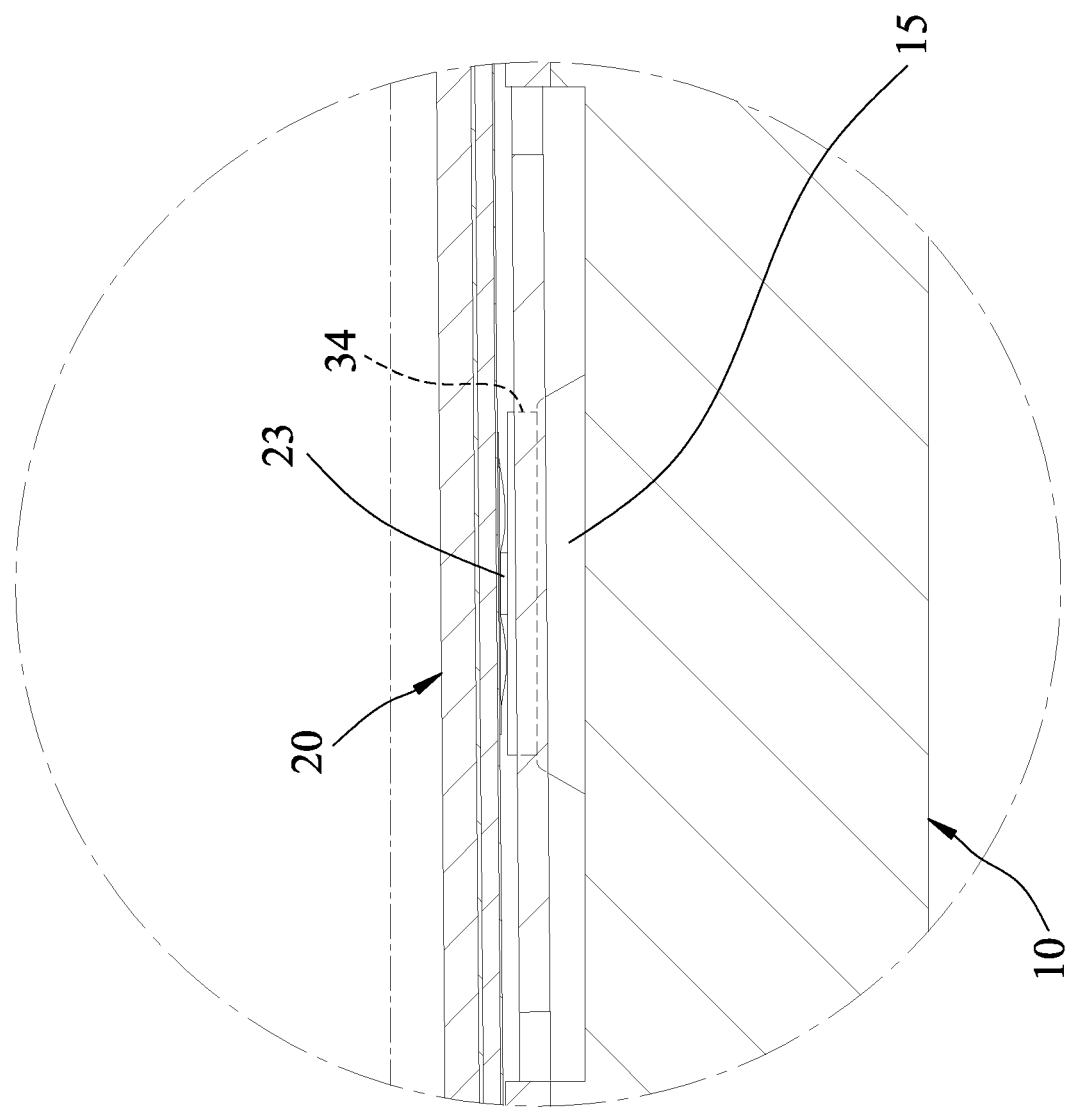
FIG. 9 is an enlarged, fragmentary view of FIG. 8.
Figure 10:
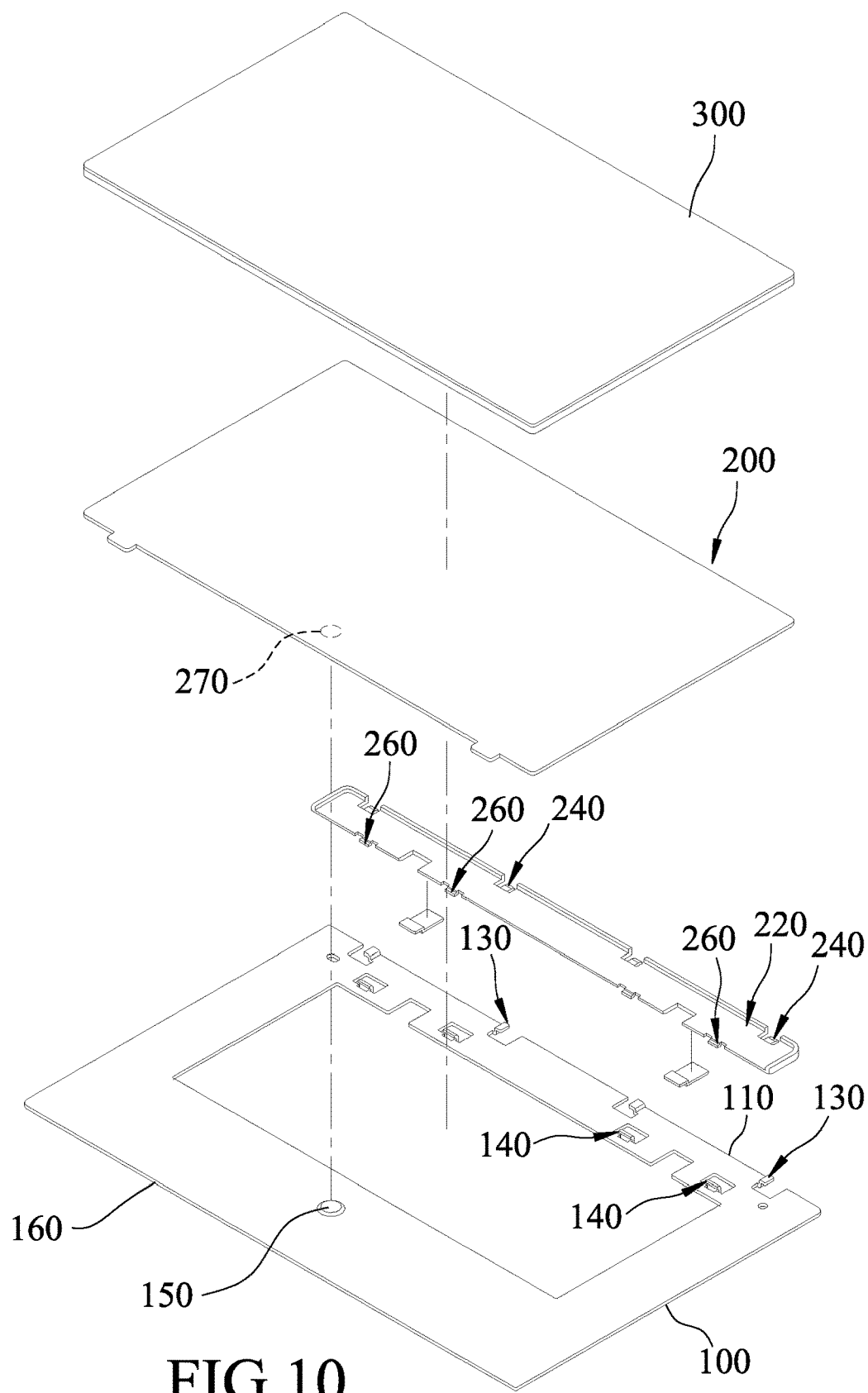
FIG. 10 is an exploded perspective view illustrating a conventional touch pad.

Referring to FIGS. 1 to 3, an embodiment of a pressing device according to the disclosure is adapted for use in a touchpad, and includes a base unit 10, an upper board unit 20, an intermediate unit 30, and a plurality of screw members 40.

The base unit 10 has an upper end surface 11, a lower end surface 12 that is opposite to the upper end surface 11, two support portions 13 that are connected to the upper end surface 11, and a abutment portion 15 that is connected to the upper end surface 11 and that is disposed between the two support portions 13. The base unit 10 further has a plurality of through holes 14, each of which extends from the lower end surface 12 to a corresponding one of the support portions 13. Each of the support portions 13 has a rectangular shape elongated in a first direction (X). The support portions 13 are spaced apart from each other in a second direction (Y) perpendicular to the first direction (X).

The upper board unit 20 is disposed over the base unit 10, and includes a panel 21, a circuit board 22 that is connected to and disposed under the panel 21, and a trigger switch 23 that is elastic, that is connected to, and that is disposed under the circuit board 22. The trigger switch 23 is aligned with the abutment portion 15 of the base unit 10.

Referring to FIGS. 1, 2 and 4 to 7, the intermediate unit 30 is disposed between the base unit 10 and the upper board unit 20. The intermediate unit 30 includes two positioning members 31 that are mounted fixedly and respectively on the support portions 13 of the base unit 10, a surrounding frame member 32 that is mounted fixedly to a bottom of the circuit board 22, two connecting members 33 that are opposite to each other, a actuating member 34 that is connected to the abutment portion 15 of the base unit 10 and that is aligned with the trigger switch 23 of the upper board unit 20, and a plurality of linking ribs 35.

The positioning members 31 of the intermediate unit 30 are spaced apart from each other in the second direction (Y).

The surrounding frame member 32 of the intermediate unit 30 surrounds positioning members 31, the connecting members 33 and the actuating member 34. The surrounding frame member 32 has a lower face 321 facing the upper end surface 11 of the base unit 10, and an upper face 322 opposite to the lower face 321 and connected fixedly to the bottom of the circuit board 22. Specifically, each of the positioning members 31 of the intermediate unit 30 has a top face 311 that is disposed below the upper face 322 of the surrounding frame member 32 and that is disposed above the lower face 321 of the surrounding frame member 32. Each of the positioning members 31 further has a bottom face 312 that is opposite to the top face 311, and that is disposed lower than the lower face 321 of the surrounding frame member 32. Each of the positioning members 31 is formed with a plurality of screw holes 313 extending from the top face 311 to the bottom face 312. In this embodiment, the surrounding frame member 32 is adhered to the bottom of the circuit board 22.

The connecting members 33 of the intermediate unit 30 are spaced apart from each other in the first direction (X). Each of the connecting members 33 has an inner segment 331 that is disposed between the positioning members 31, and an outer segment 332 that is connected to an end of the inner segment 331 opposite to the other one of the connecting members 33 in the first direction (X). The outer segment 332 has a width in the second direction (Y) larger than that of the inner segment 331. For each of the connecting members 33, upper end faces of the inner and outer segments 331, 332 constitute an upper end face 333 of the connecting member 33, and lower end faces of the inner and outer segments 331, 332 constitute a lower end face 334 of the connecting member 33 opposite to the upper end face 333. The upper end face 333 is disposed above the lower face 321 of the surrounding frame member 32 and is disposed below the upper face 322 of the surrounding frame member 32. The lower end face 334 is disposed below the lower face 321 of the surrounding frame member 32.

The linking ribs 35 of the intermediate unit 30 interconnect the positioning members 31 and the connecting members 33, interconnect the connecting members 33 and the actuating member 34, and interconnect the connecting members 33 and the surrounding frame member 32. Each of the linking ribs 35 has a thickness smaller than those of the positioning members 31, the surrounding frame member 32, the connecting members 33 and the actuating member 34.

The screw members 40 fasten the positioning members 31 of the intermediate unit 30 on the support portions 13 of the base unit 10. Each of the screw members 40 extends through a corresponding one of the through holes 14 of the base unit 10 and engages threadedly a corresponding one of the screw holes 313 of the positioning members 31.

Referring to FIGS. 3 to 7, when the pressing device of the disclosure is not in use, the trigger switch 23 of the upper board unit 20 is at an initial state and is in contact with the actuating member 34 of the intermediate unit 30 without being deformed or compressed, and the actuating member 34 abuts against the abutment portion 15 of the base unit 10. Because of the elastic property of the trigger switch 23, the panel 21 and the circuit board 22 of the upper board unit 20 are maintained at their original position. At this moment, no signal is generated as the trigger switch 23 has not been triggered by the actuating member 34.

Since the support portions 13 of the base unit 10 protrude from the upper end surface 11 of the base unit 10, and since the bottom face 312 of each positioning member 31 of the intermediate unit 30 is disposed lower than the lower face 321 of the surrounding frame member 32, a buffering space is formed between the lower face 321 of the surrounding frame member 32 and the upper end surface 11 of the base unit 10 for the upper board unit 20 to move toward the base unit 10.

Referring to FIGS. 3, 5, 8, and 9, when the upper board unit 20 is pressed at a position directly above the surrounding frame member 32 of the intermediate unit 30, one of the connecting members 33 receives the pressure through the corresponding linking ribs 35. Consequently, the one of the connecting members 33 is moved relative to the actuating member 34 by virtue of resilient deformation of corresponding linking ribs 35, thereby exerting a downward force on the actuating member 34 to urge the actuating member 34 against the abutment portion 15, which is non-deformable, so the abutment portion 15 provides an upward reaction force against the actuating member 34 that drives the actuating member 34 to move upward and provide a force against the trigger switch 23 to thereby convert the trigger switch 23 from the initial state to a triggered state, which is realized by virtue of the elastic property of the trigger switch 23.

When the upper board unit 20 is pressed at a position directly above one of the connecting members 33, the one of the connecting members 33 is directly moved relative to the actuating member 34 by virtue of corresponding linking ribs 35, thereby exerting a downward force on the actuating member 34, which exerts a downward force on the abutment portion 15, so the abutment portion 15 provides an upward reaction force that brings the actuating member 34 to move upward toward the trigger switch 23 to thereby convert the trigger switch 23 from the initial state to the triggered state.

When the upper board unit 20 is pressed at a central position directly above the actuating member 34, the actuating member 34 directly converts the trigger switch 23 from the initial state to the triggered state.

The configurations that the intermediate unit 30 is disposed between the base unit 10 and the upper board unit 20 and that the linking ribs 35 of the intermediate unit 30 interconnect the surrounding frame member 32, the connecting members 33, and the actuating member 34 offer technical advantages. When the upper board unit 20 receives the pressure at different positions other than the central position, the upper board unit 20 can steadily move towards the base unit 10 by virtue of the abovementioned configurations, and the trigger switch 23 can effectively trigger signals.

As shown in FIGS. 4 to 6 and 8, the pressing device in this disclosure further includes a top cover 1 that restricts movement of the edge of the upper board unit 20, and therefore, when one side of the upper board unit 20 is pressed, the other side of the upper board unit 20 will be not tilted.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A pressing device for a touchpad, comprising:
   a base unit having an upper end surface, two support portions that are connected to said upper end surface, and a abutment portion that is connected to said upper end surface and that is disposed between said support portions;
   an upper board unit disposed over said base unit and including
      a panel,
      a circuit board that is connected to and disposed under said panel, and
      a trigger switch that is connected to and disposed under said circuit board, and that is aligned with said abutment portion of said base unit; and
   an intermediate unit disposed between said base unit and said upper board unit, and including
      two positioning members that are mounted fixedly and respectively on said support portions of said base unit,
      a surrounding frame member that is mounted fixedly to a bottom of said circuit board,
      two connecting members that are opposite to each other,
      a actuating member that is connected to said abutment portion of said base unit and that is aligned with said trigger switch of said upper board unit, and
      a plurality of linking ribs that interconnect said positioning members and said connecting members, that interconnect said connecting members and said actuating member, and that interconnect said connecting members and said surrounding frame member;
   wherein, when said upper board unit is pressed at a position above one of said surrounding frame member and said connecting members, one of said connecting members is moved relative to said actuating member by virtue of said linking ribs, which urges said actuating member against said abutment portion so said actuating member is driven to provide a force against said trigger switch to thereby convert said trigger switch from an initial state to a triggered state.

2. The pressing device as claimed in claim 1, wherein each of said linking ribs of said intermediate unit has a thickness smaller than those of said positioning members, said surrounding frame member, said connecting members and said actuating member.

3. The pressing device as claimed in claim 1, wherein said surrounding frame member of said intermediate unit is adhered to the bottom of said circuit board.

4. The pressing device as claimed in claim 1, wherein:
   said connecting members of said intermediate unit are spaced apart from each other in a first direction;
   said positioning members of said intermediate unit are spaced apart from each other in a second direction perpendicular to the first direction; and
   each of said connecting members has
      an inner segment that is disposed between said positioning members, and
      an outer segment that is connected to an end of said inner segment opposite to the other one of said connecting members in the first direction, and that has a width in the second direction larger than that of said inner segment.

5. The pressing device as claimed in claim 1, further comprising a plurality of screw members fastening said positioning members of said intermediate unit on said support portions of said base unit.

6. The pressing device as claimed in claim 5, wherein:
   said base unit further has a lower end surface opposite to said upper end surface, and a plurality of through holes, each through hole extending from said lower end surface to a corresponding one of said support portions;
   each of said positioning members is formed with a plurality of screw holes; and
   each of said screw members extending through a corresponding one of said through holes of said base unit and engaging threadedly a corresponding one of said screw holes of said positioning members.

7. The pressing device as claimed in claim 1, wherein:
   said surrounding frame member of said intermediate unit has a lower face facing said upper end surface of said base unit, and an upper face opposite to said lower face and connected fixedly to the bottom of said circuit board; and
   each of said positioning members of said intermediate unit has a top face disposed below said upper face of said surrounding frame member and disposed above said lower face of said surrounding frame member, and a bottom face opposite to said top face and disposed lower than said lower face of said surrounding frame member.

8. The pressing device as claimed in claim 7, wherein each of said connecting members of said intermediate unit has an upper end face disposed above said lower face of said surrounding frame member and disposed below said upper face of said surrounding frame member, and a lower end face opposite to said upper end face and disposed below said lower face of said surrounding frame member.

* * * * *